Feb. 24, 1931.  M. FERRIS  1,793,601
METHOD OF AND MEANS FOR DETERMINING SENSITIVITY
Filed Oct. 11, 1928   3 Sheets-Sheet 1
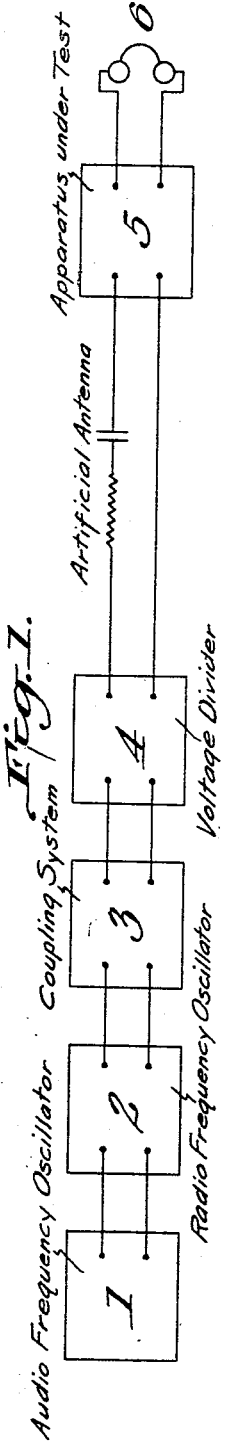
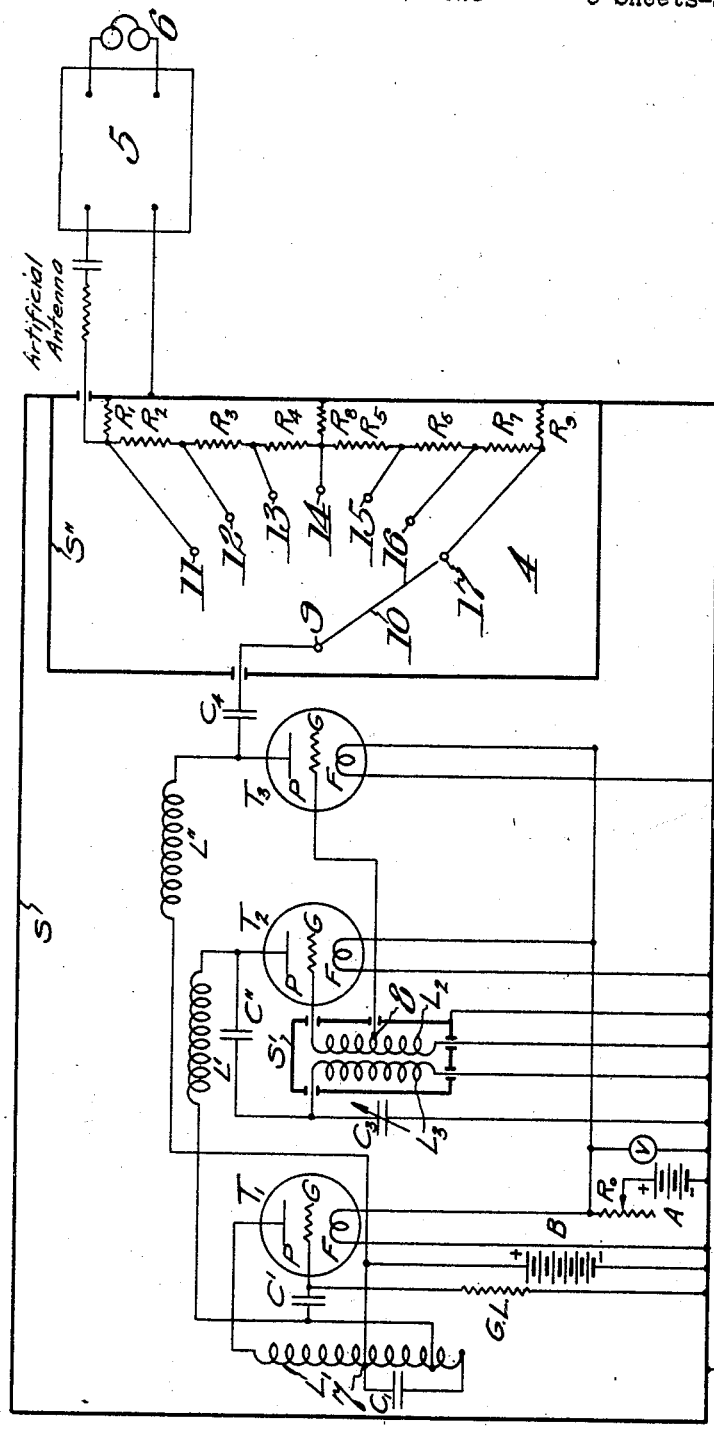

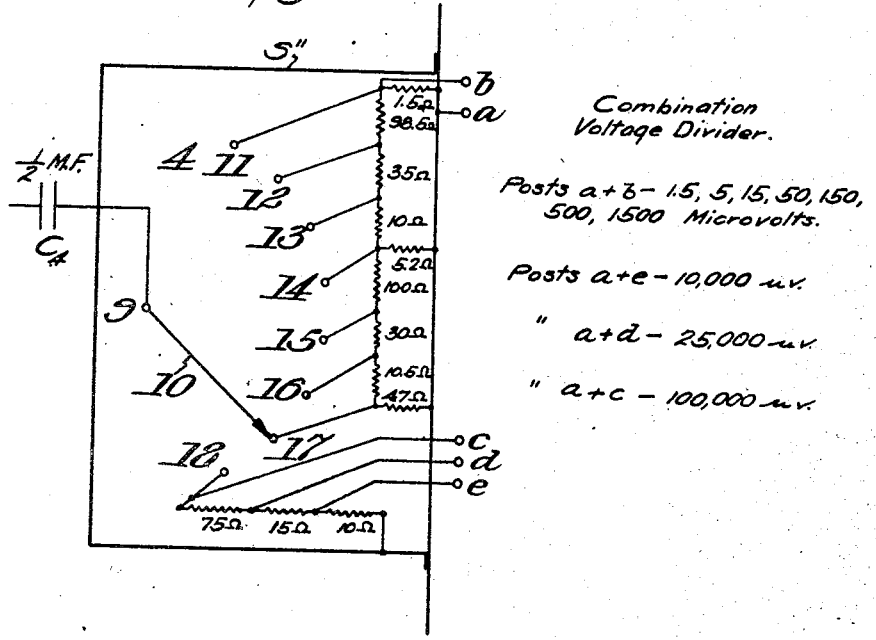
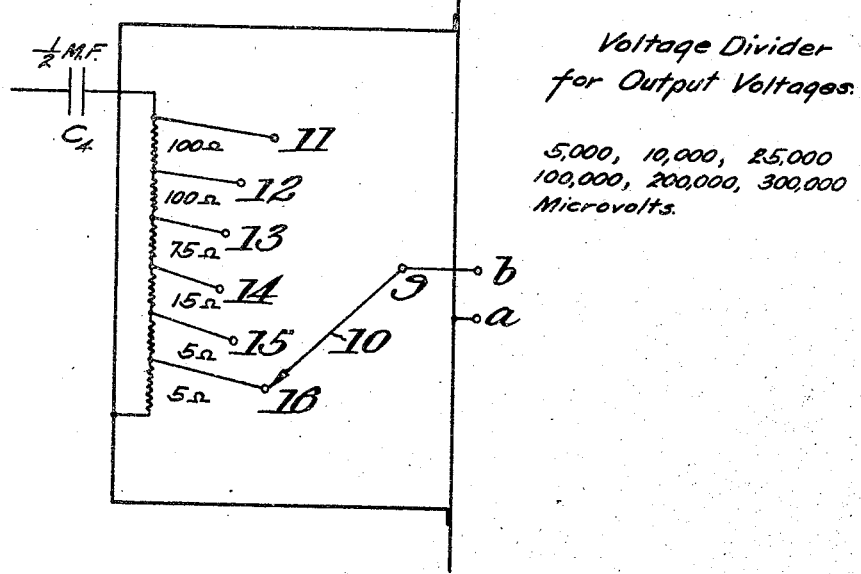

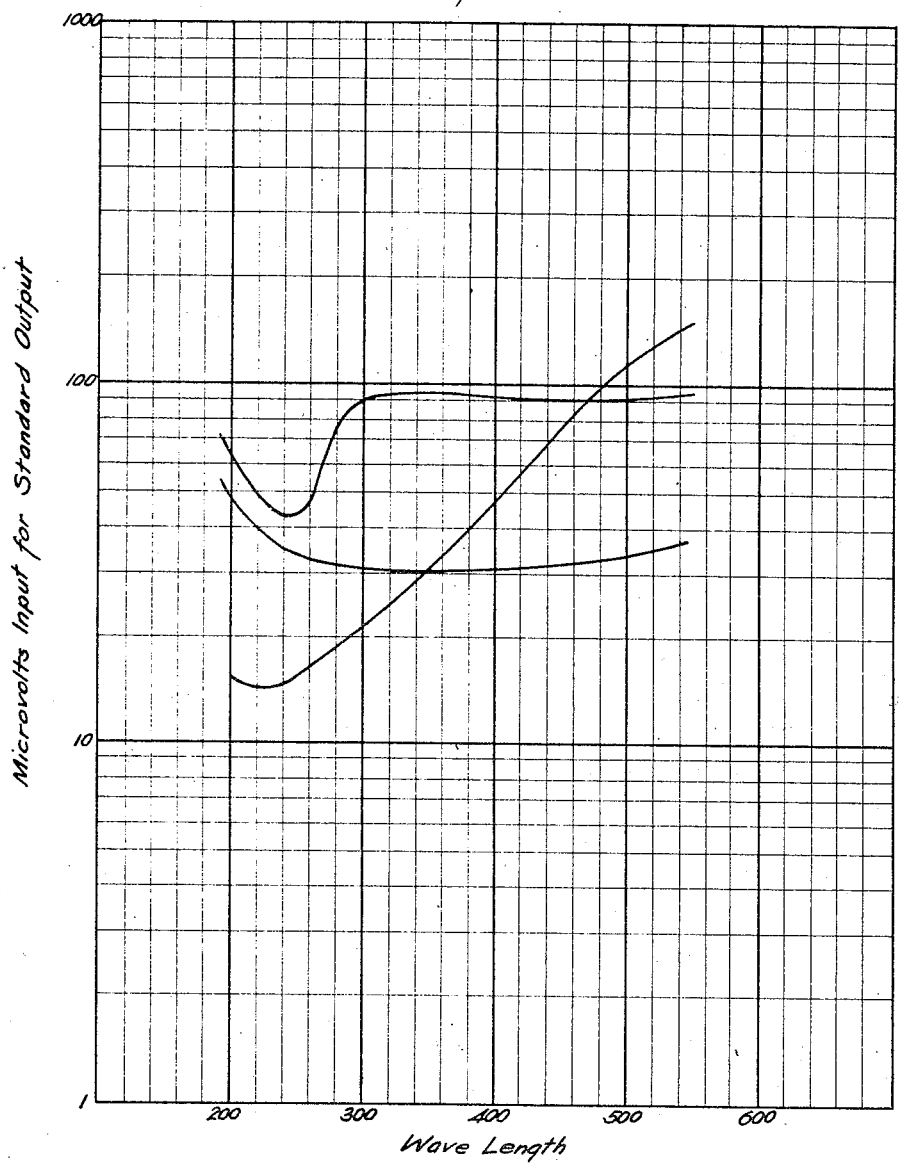

Patented Feb. 24, 1931

1,793,601

UNITED STATES PATENT OFFICE

MALCOLM FERRIS, OF BOONTON, NEW JERSEY, ASSIGNOR TO RADIO FREQUENCY LABORATORIES, INC., OF BOONTON, NEW JERSEY, A CORPORATION OF NEW JERSEY

METHOD OF AND MEANS FOR DETERMINING SENSITIVITY

Application filed October 11, 1928. Serial No. 311,911.

This invention relates to the art of determining or measuring sensitivity, and in particular to a method of and means for the approximate determination or measurement of the sensitivity of electrical amplifiers or amplifying apparatus, of which a typical example, with reference to which the invention will hereafter be described, is a radio receiving set. The invention relates also to an electrical circuit, and an instrument embodying the same, for use in making such determinations.

Hitherto the only apparatus available for making sensitivity determinations of the foregoing type has been of a character the use of which is strictly limited to the laboratory, has been relatively large and complicated, has been fixed in character, rather than portable, ordinarily requiring considerable space for its set-up, and has required the use of measuring instruments for determining amounts of radio frequency current involved. An object of the present invention is to provide a simple, easily operated, portable, and convenient instrument for making approximate sensitivity determinations of the foregoing character, and for use in testing or balancing electrical amplifying apparatus such as radio receiving sets. A further object of the invention is to provide such a device in which the radio frequency output current is automatically maintained approximately constant, the desired voltages being derived therefrom by means of a known voltage divider, and the necessity for adjustments of the apparatus and for the use of measuring instruments to determine the current values being thereby eliminated. Other objects of the present invention will appear from the following description.

Referring now to the drawings, Figure 1 is a theoretical or block diagram illustrating the organization of one typical embodiment of the present invention; Figure 2 is a circuit diagram of one form of electrical circuit and instrument for use in making approximate sensitivity determinations on broadcast radio receiving sets or similar apparatus; Figures 3a and 3b illustrate alternative forms of voltage dividers for use in the device of Figure 2; and Figure 4 shows typical sensitivity curves obtained with apparatus embodying the present invention.

Referring now to Figure 1, 1 represents an audio frequency oscillator, which may suitably be designed to oscillate at a constant frequency and to maintain a substantially constant output. 2 is a radio frequency oscillator which is so connected as to be modulated by the audio frequency oscillator 1. The radio frequency oscillator is arranged to be variable or tunable over the wavelength range throughout which it is desired to perform sensitivity determinations, for example the wavelength range of a broadcast radio receiving set to be tested. The radio frequency oscillator 2 is preferably so designed as to automatically maintain an approximately constant radio frequency voltage across its output terminals over the wavelength range to which it is tunable, this approximately constant radio frequency voltage across the output terminals being of course modulated at a constant frequency and to an approximately constant degree by the audio frequency oscillations generated by the audio frequency oscillator 1. 3 represents a coupling system interposed between the radio frequency oscillator 2 and the voltage divider 4 and designed to operate upon the constant radio frequency voltage across the output terminals of the radio frequency oscillator 3 to deliver an approximately constant radio frequency current to the voltage divider or attenuator 4. The latter may consist for example of a combination of resistances arranged to supply various values of known radio frequency voltage, derived from the passage therethrough of the constant radio frequency current in the coupling system, to the apparatus under test shown at 5. By maintaining the radio frequency current applied to the voltage divider 4 approximately constant at a given value, and employing known resistances in the voltage divider 4, the radio frequency voltages derived therefrom are known, and the necessity for measuring instruments to measure the radio frequency output current, or the current applied to the apparatus under test, is eliminated.

An example of a method of making approximate sensitivity determinations on any given apparatus 5, for example a broadcast radio receiving set, is as follows: The antenna terminal of the set to be tested is connected to the high-potential terminal of the voltage divider 4 through an artificial antenna, for example a small condenser in series with a resistance, and the ground terminal of the set to be tested is connected to the low-potential terminal of the voltage divider 4. For any desired number of different frequency settings of the radio frequency oscillator 2, at frequencies throughout the frequency range of the receiver under test, the voltage divider 4 is adjusted, for example by steps, so as to apply to the input terminals of the radio receiver under test that known voltage which is required in order to produce a given constant strength of signal or response in an indicating device 6 applied to the output terminals of the receiver being tested. By this means a sensitivity curve may be obtained showing the sensitivity of the receiver under test, ordinarily in micro-volts input required to produce a given output, at various frequencies throughout the frequency range of the receiver being tested. Typical examples of such sensitivity curves, obtained in this way, are given in Figure 4, the required input in micro-volts to give a constant output being plotted as ordinates against wavelength as abscissæ.

The foregoing illustration is given, as stated above, in connection with a broadcast radio receiving set, in which it is necessary that the radio frequency oscillations be modulated in order that an audible response be obtained. In certain cases, however, this modulation is not required, for example, when the apparatus to be tested is of the type designed for continuous wave reception, or when audible indication is not desired. In such cases, the audio oscillator described in connection with the above example may be eliminated from the apparatus.

Figure 2 illustrates an electrical circuit arrangement and instrument embodying the same constituting a typical physical embodiment of the present invention as used for the testing of broadcast radio receiving sets. Within a shield S, such as a shielded cabinet, which may be grounded as shown, if desired, and which is ordinarily connected to the ground terminal of the apparatus under test, I enclose three vacuum tubes or audions, $T_1$, $T_2$, and $T_3$, which may be of either the three-electrode or four-electrode type, and are here shown as being each provided with an anode or plate P, a control electrode or grid G, and an electron emitting cathode or filament F. Tube $T_1$ is connected as an audio frequency oscillator, the inductance $L_1$ being connected at one terminal to the plate, at an intermediate point 7 to the filament through the "B"-battery B, and at or near its other terminal to the grid G through blocking condenser C', arranged to keep the "B"-battery voltage off of the grid, grid leak G. L. being connected between grid and ground. The oscillatory circuit is completed by condenser $C_1$ connected across a portion of the inductance $L_1$ as shown, the inductance and capacity being so chosen as to cause the generation of audio frequency oscillations of any desired frequency, for example 400 cycles. Condenser $C_1$ may, of course, be adjustable so as to permit the generation of audio frequency oscillations of different frequencies, but this is usually unnecessary in the case of the approximate sensitivity determinations for which this apparatus is intended. The inductance $L_1$ may of course be suitably provided with an iron core. The filament may be of either the alternating current, or direct current, or heater type, and is here shown as being heated by direct current from a battery A, controlled through rheostat Ro, the the filament voltage being indicated by the measuring instrument V. Tube $T_2$ is arranged as a radio frequency oscillator, the primary coil $L_2$ being connected between its grid G and filament F, and the secondary coil $L_3$, coupled to $L_2$, being connected between its plate P and filament F. The oscillatory circuit is tuned by means of condenser $C_3$ connected across the plate coil $L_3$, this condenser being variable through such a range as to give the desired frequency range to the radio frequency oscillator. The plate P is connected through the radio frequency choke coil L' to the same terminal on the audio frequency oscillator coil $L_1$ as is the lead from the grid of the audio frequency oscillator tube $T_1$ through the condenser C'. Blocking condenser C" is inserted in the connection from the plate P of tube $T_2$ to the plate coil $L_3$ to prevent short circuit. The filament F is suitably supplied from the same A-battery. The coils $L_2$ and $L_3$ are preferably enclosed in a supplementary shield S' connected to the shield S. The radio frequency oscillator including the tube $T_2$, coils $L_2$ and $L_3$, and tuning condenser $C_3$, is so designed as to give an approximately constant radio frequency voltage across its output terminals. One suitable way of accomplishing this is to limit the radio frequency output voltage by losses in the grid circuit, including grid current which is drawn when the grid goes positive, a grid leak being omitted. Other methods of accomplishing the desired result, namely an approximately constant radio frequency voltage across the output terminals of the radio frequency oscillator, may, of course, be alternatively employed. The tube $T_3$ is arranged to constitute a part of a coupling system between the radio frequency oscillator and the voltage divider 4. The grid of the tube $T_3$ is connected to an intermediate point 8 in the grid coil of the radio frequency oscillator, and its plate is supplied with direct current from the battery B through radio frequency choke coil $L''$. Its filament is suitably supplied with current from the battery A. By this arrangement the coupling tube $T_3$ operates upon an approximately constant radio frequency voltage derived from the radio frequency oscillator including tube $T_2$, and delivers an approximately constant radio frequency current. This current flows between the plate P of tube $T_3$ and its filament F which is grounded. This plate-filament circuit of the tube $T_3$ includes the large, low radio frequency impedance condenser $C_4$ and the voltage divider 4. The latter is preferably enclosed in a separate shield $S''$, and comprises a switch 9 having a switch arm 10 and a plurality of contact points 11, 12, 13, 14, 15, 16 and 17. These contact points are connected as shown to the resistances of the voltage divider, the latter including output resistance $R_1$ and resistances $R_2$, $R_3$, $R_4$, $R_5$, $R_6$, $R_7$, $R_8$, and $R_9$ arranged as shown. By this arrangement of resistances the desired steps of known radio frequency output voltage may be derived from the voltage divider by virtue of the constant radio frequency current flowing therethrough. Depending upon the position of the switch contact arm 10, any desired known voltage steps may be obtained from the voltage divider within the voltage limit for which it is designed. The following steps of output voltage, in micro-volts, have been found suitable, viz., 1½, 5, 15, 50, 150, 500 and 1500, for use in determining the sensitivity of ordinary multi-stage broadcast radio receivers such as are now commonly used, although of course any other voltage steps may be employed depending upon the apparatus of which it is desired to determine the sensitivity. The voltages derived from the voltage divider are applied to the apparatus 5 of which the sensitivity is to be measured through the artificial antenna, which may include a condenser and a resistance, or which may be merely a condenser having high dielectric losses, and the output from the apparatus under test is observed in any suitable indicating device 6 for different input voltages applied to the apparatus and for different frequencies.

In one particular example of such an instrument, which I have used successfully, as described above, I have employed the following constants with satisfactory results:

| | |
|---|---|
| $T_1$ | = UX 199 tube |
| $T_2$ | = UX 199 tube |
| $T_3$ | = UX 120 tube |
| A-battery | = 4½ volts |
| B-battery | = 22½ volts |
| GL | = 100,000 ohms |
| $C'$ | = .01 m.f. |
| $C_1$ | = .01 m.f. |
| $L_1$ | = standard telephone transformer, iron core approximately ½" square, with 4800 turns plate coil, 2800 turns grid coil, and 1200 turns between the grid tap and condenser $C_1$ |
| $L_2$ | = 65 turns No. 32 double silk wire on 1" form with tap 8 at 32 turns above ground |
| $L_3$ | = 73 turns No. 30 enameled wire on 1¼" form |
| $C_3$ | = 350 m.m.f. max. |
| $C_4$ | = .5 m.f. |
| $C''$ | = .01 m.f. |
| $R_1$ | = 1.5 ohms |
| $R_2$ | = 98.5 " |
| $R_3$ | = 35 " |
| $R_4$ | = 10 " |
| $R_5$ | = 100 " |
| $R_6$ | = 30 " |
| $R_7$ | = 10.5 " |
| $R_8$ | = 5.2 " |
| $R_9$ | = 4.7 " |

With the foregoing arrangement the audio oscillator delivers a voltage of approximately 5 volts r.m.s., producing 30% modulation. The tap 8 on the coil $L_2$ is set to give a radio frequency current of approximately 1 milliampere through the ½ m.f. condenser $C_4$ and through the voltage divider 4.

Figures 3a and 3b show alternative arrangements for the voltage divider 4, the arrangement of the switch contact points 11—18 and the values of the several resistances being indicated thereon, and the resultant micro-volts derived from binding posts a—e, being shown by the legends.

Due to the fact that it is extremely difficult or impossible to perform accurate measurements of radio frequency voltages of the order of a few micro-volts, I have found that it is far preferable to employ a known voltage divider for deriving known voltages from a constant radio frequency current passed therethrough as explained above.

The purpose of the shield $S'$ is to confine the magnetic field of the coils $L_2$ and $L_3$, so that there is no strong magnetic field elsewhere inside of shield S. There is, however, considerable electro-static field, due to the fact that the tube elements and the leads thereto are at high radio frequency potential, and in order to prevent errors due to stray capacities between these points and the voltage divider, the voltage divider and its switch are preferably enclosed in the shield S''.

It is of course understood that the constants and specific circuit arrangements described above apply merely to a specific example. By suitably altering these constants and shifting the range of the radio frequency oscillator, the instrument may be made suitable for use in making sensitivity determinations on any desired variety of electrical amplifying apparatus. For example, it has been successfully used in determining and testing the sensitivity of aircraft radio receiving sets, of which the frequency range is 285 to 350 kilocycles. As stated above, the apparatus may also be adapted for the making of measurements on apparatus designed for continuous wave reception, in which case the audio frequency oscillator may be eliminated. The results obtained with a small portable apparatus of the foregoing type are not, of course, as accurate as those which can be obtained with a large and complicated apparatus such as can be set up in a laboratory. I have found however that the results may be relied upon to within a relatively few percent, which is close enough for a wide variety of practical purposes, and it should be understood that the apparatus as described above is not intended for use in making high-precision laboratory measurements, but only for making approximate determinations of a practical nature.

The foregoing circuit diagrams and circuit constants are here given merely by way of illustration of the present invention, which includes within its scope a wide variety of modifications and variations of the examples given herein, as has been indicated in the foregoing description and as will appear from the appended claims.

I claim:

1. In an apparatus for the determination of sensitivity of electrical amplifiers, the combination of an audio frequency oscillator, a radio frequency oscillator tunable over a given range of frequencies, connections whereby audio frequency oscillations generated by said audio frequency oscillator are caused to modulate said radio frequency oscillator, means associated with said radio frequency oscillator for automatically regulating the modulated radio frequency output voltage delivered thereby to render the same approximately constant over its said frequency range, a coupling system associated with said radio frequency oscillator and arranged to have applied thereto as its input said approximately constant radio frequency voltage generated by said radio frequency oscillator and to deliver as its output an approximately constant radio frequency current, and a voltage divider associated with said coupling system and comprising a plurality of known impedances so disposed with regard to said approximately constant radio frequency current derived from said coupling system as to furnish by means of the voltage drops therethrough a plurality of desired known voltages for application to apparatus to be tested, whereby the sensitivity of said apparatus to be tested may be determined by means of the input voltage required to be applied thereto in order to produce therein a given response at different frequencies.

2. In an apparatus for the determination of sensitivity of electrical amplifiers, the combination of a fixed audio frequency oscillator adjusted to a standard testing frequency, a radio frequency oscillator tunable over a given range of frequency, connections whereby audio frequency oscillations generated by said audio frequency oscillator are caused to modulate said radio frequency oscillator to a standard degree, means comprising a grid circuit having predetermined controlled losses therein associated with said radio frequency oscillator for automatically regulating the modulated radio frequency output voltage delivered thereby to render the same approximately constant over its said frequency range, a coupling system comprising a vacuum tube provided with at least a plate, a grid, and a filament, associated with said radio frequency oscillator in such a manner that said approximately constant radio frequency voltage derived from said radio frequency oscillator is applied to the grid and filament terminals of said vacuum tube and that the radio frequency plate current flowing in the plate circuit of said vacuum tube is substantially constant, and a voltage divider associated with said coupling system and comprising a plurality of known impedances so disposed with regard to said approximately constant radio frequency current derived from the plate circuit of said vacuum tube in said coupling system as to furnish by means of the voltage drops therethrough a plurality of desired known voltages for application to apparatus to be tested, whereby the sensitivity of said apparatus to be tested may be determined by means of the input voltage required to be applied thereto in order to produce therein a given response at different frequencies.

3. In an apparatus for the determination of sensitivity of electrical amplifiers, the combination of an audio frequency oscillator comprising a vacuum tube and an oscillatory circuit associated therewith in such a manner as to cause generation of sustained audio frequency oscillations; a radio frequency oscillator comprising a vacuum tube and an oscillatory circuit associated therewith, said circuit being tunable over a given range of frequencies to cause the generation of sustained radio frequency oscillations at any desired frequency over said range of frequencies; connections whereby audio frequency oscillations generated by said audio frequency oscillator are caused to modulate said radio frequency oscillator; means associated with said radio frequency oscillator for automatically regulating the modulated radio frequency output voltage delivered thereby to render the same approximately constant over the said frequency range; a coupling system comprising a vacuum tube provided with at least a plate, a grid, and a filament, associated with said radio frequency oscillator in such a manner that said approximately constant radio frequency voltage derived from said radio frequency oscillator is applied to the grid and filament terminals of said vacuum tube and that the radio frequency plate current flowing in the plate circuit of said vacuum tube is substantially constant; and a voltage divider associated with said coupling system and comprising a plurality of known impedances so disposed with regard to said approximately constant radio frequency current derived from the plate circuit of said vacuum tube in said coupling system as to furnish by means of the voltage drops therethrough a plurality of desired known voltages for application to apparatus to be tested, whereby the sensitivity of said apparatus to be tested may be determined by means of the input voltage required to be applied thereto in order to produce therein a given response at different frequencies.

4. In an apparatus for the determination of sensitivity of electrical amplifiers, the combination of a radio frequency oscillator tunable over a given range of frequencies, and so designed and proportioned as to be automatically self-regulating to deliver an approximately constant radio frequency output voltage over its said range of frequencies, and a voltage dividing system for applying to apparatus to be tested a plurality of desired values of known voltage derived from said radio frequency oscillator, whereby the sensitivity of said apparatus to be tested may be determined by means of the input voltage required to be applied thereto in order to produce therein a given response at different frequencies.

5. In an apparatus for the determination of sensitivity of electrical amplifiers, the combination of a radio frequency oscillator tunable over a given range of frequencies, means associated with said oscillator for automatically regulating the radio frequency output voltage delivered thereby to render the same approximately constant over its said frequency range, a coupling system associated with said radio frequency oscillator and arranged to have applied thereto as its input said approximately constant radio frequency voltage generated by said radio frequency oscillator and to deliver as its output an approximately constant radio frequency current, and a voltage divided associated with said coupling system and comprising a plurality of known impedances so disposed with regard to said approximately constant radio frequency current derived from said coupling system as to furnish by means of the voltage drops therethrough a plurality of desired known voltages for application to apparatus to be tested, whereby the sensitivity of said apparatus to be tested may be determined by means of the input voltage required to be applied thereto in order to produce therein a given response at different frequencies.

6. In an apparatus for the determination of sensitivity of electrical amplifiers, the combination of an audio frequency oscillator, a radio frequency oscillator tunable over a given range of frequencies, connections whereby audio frequency oscillations generated by said audio frequency oscillator are caused to modulate said radio frequency oscillator, means associated with said radio frequency oscillator for automatically regulating the modulated radio frequency output voltage delivered thereby to render the same approximately constant over its said frequency range, and a voltage divider associated with said radio frequency oscillator and comprising a plurality of known impedances so disposed with regard to said output of said radio frequency oscillator as to furnish by means of the voltage drops therethrough a plurality of desired known voltages for application to apparatus to be tested, whereby the sensitivity of said apparatus to be tested may be determined by means of the input voltage required to be applied thereto in order to produce therein a given response at different frequencies.

7. An instrument for use in the determination of sensitivity of electrical amplifiers, comprising an audio frequency oscillator, a radio frequency oscillator tunable over a given range of frequencies, connections whereby audio frequency oscillations generated by said audio frequency oscillator are caused to modulate said radio frequency oscillator, means associated with said radio frequency oscillator for automatically regulating the modulated radio frequency output voltage delivered thereby to render the same approximately constant over the said frequency range of said oscillator, a coupling system associated with said radio frequency oscillator and arranged to have applied thereto as its input said approximately constant radio frequency voltage generated by said radio frequency oscillator and to deliver as its output an approximately constant radio frequency current, a voltage divider associated with said coupling system and comprising a plurality of known impedances so disposed with regard to said approximately constant radio frequency current derived from said coupling system as to furnish by means of the voltage drops therethrough a plurality of desired known voltages for application to apparatus to be tested, and a grounded conductive shield surrounding and enclosing the entire apparatus except for the necessary connections for applying said known voltages to the apparatus to be tested.

8. An instrument for use in the determination of sensitivity of electrical amplifiers, comprising an audio frequency oscillator, a radio frequency oscillator tunable over a given range of frequencies, connections whereby audio frequency oscillations generated by said audio frequency oscillator are caused to modulate said radio frequency oscillator, means associated with said radio frequency oscillator for automatically regulating the modulated radio frequency output voltage delivered thereby to render the same approximately constant over the said frequency range of said oscillator, a coupling system associated with said radio frequency oscillator and arranged to have applied thereto as its input said approximately constant radio frequency voltage generated by said radio frequency oscillator and to deliver as its output an approximately constant radio frequency current, a voltage divider associated with said coupling system and comprising a plurality of known impedances so disposed with regard to said approximately constant radio frequency current derived from said coupling system as to furnish by means of the voltage drops therethrough a plurality of desired known voltages for application to apparatus to be tested, a grounded conductive shield surrounding and enclosing the entire apparatus except for the necessary connections for applying said known voltages to the apparatus to be tested, and an additional conductive shield positioned within said first-mentioned shield and enclosing said voltage divider in such a manner as to shield the same from the remainder of said apparatus 9. An instrument for use in the determination of sensitivity of electrical amplifiers, comprising an audio frequency oscillator, a radio frequency oscillator tunable over a given range of frequencies, connections whereby audio frequency oscillations generated by said audio frequency oscillator are caused to modulate said radio frequency oscillator, means associated with said radio frequency oscillator for automatically regulating the modulated radio frequency output voltage delivered thereby to render the same approximately constant over the said frequency range of said oscillator, a coupling system associated with said radio frequency oscillator and arranged to have applied thereto as its input said approximately constant radio frequency voltage generated by said radio frequency oscillator and to deliver as its output an approximately constant radio frequency current, a voltage divider associated with said coupling system and comprising a plurality of known impedances so disposed with regard to said approximately constant radio frequency current derived from said coupling system as to furnish by means of the voltage drops therethrough a plurality of desired known voltages for application to apparatus to be tested, a grounded conductive shield surrounding and enclosing the entire apparatus except for the necessary connections for applying said known voltages to the apparatus to be tested, and an additional conductive shield positioned within said first-mentioned shield and surrounding a portion of the circuit of said radio frequency oscillator in such a manner as to shield the same from the remainder of said apparatus.

10. Method of measuring sensitivity of electrical amplifiers which comprises generating radio frequency oscillations of variable frequency over a given range of variation, automatically regulating said radio frequency oscillations to produce an approximately constant radio frequency voltage at all frequencies within said range of variation, applying said approximately constant radio frequency voltage to a coupling system to produce an approximately constant radio frequency current, applying said approximately constant radio frequency current to a voltage divider to derive therefrom a plurality of desired known voltages, and applying said known voltages to the amplifier to be tested to determine the input voltage required to be applied to said amplifier under test to produce therein a given response at different frequencies.

11. Method of measuring sensitivity of electrical amplifiers which comprises generating radio frequency oscillations of variable frequency, automatically regulating said radio frequency oscillations to produce an approximately constant radio frequency output, applying said approximately constant radio frequency output to an attenuator or voltage divider in such a manner as to derive therefrom a plurality of desired known voltages, and applying said known voltages to the amplifier to be tested in such a manner as to determine the input voltage required by said amplifier to produce a given response at different frequencies.

12. Method of measuring sensitivity of electrical amplifiers which comprises generating audio frequency oscillations, generating radio frequency oscillations of variable frequency, causing said audio frequency oscillations to modulate said radio frequency oscillations, automatically regulating said radio frequency oscillations to produce an approximately constant modulated radio frequency voltage at all frequencies within the range of variations thereof, applying said approximately constant modulated radio frequency voltage to a coupling system to produce an approximately constant radio frequency current, applying said approximately constant radio frequency current to a voltage divider to derive therefrom a plurality of desired known voltages, and applying said known voltages to the amplifier to be tested to determine the input voltage required to be applied to said amplifier under test to produce therein a given response at different frequencies.

In testimony whereof, I affix my signature.
MALCOLM FERRIS.